(12) United States Patent
Saberton

(10) Patent No.: US 12,017,407 B2
(45) Date of Patent: *Jun. 25, 2024

(54) INTERLOCKING INFILL FOR ADDITIVE MANUFACTURING PRODUCTS

(71) Applicant: Mark Saberton, Bonita Springs, FL (US)

(72) Inventor: Mark Saberton, Bonita Springs, FL (US)

(73) Assignee: Addman Intermediate Holdings, LLC, Fort Myers, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,985

(22) Filed: May 25, 2022

(65) Prior Publication Data

US 2023/0249401 A1 Aug. 10, 2023

Related U.S. Application Data

(63) Continuation-in-part of application No. 17/667,081, filed on Feb. 8, 2022.

(51) Int. Cl.
*B29C 64/188* (2017.01)
*B29C 64/112* (2017.01)
*B29C 64/343* (2017.01)
*B33Y 10/00* (2015.01)
*B33Y 40/00* (2020.01)

(52) U.S. Cl.
CPC .......... *B29C 64/188* (2017.08); *B29C 64/112* (2017.08); *B29C 64/343* (2017.08); *B33Y 10/00* (2014.12); *B33Y 40/00* (2014.12); *B29K 2995/0078* (2013.01); *B29K 2995/0094* (2013.01)

(58) Field of Classification Search
CPC ... B29C 64/112; B29C 64/343; B29C 64/106; B29C 64/188; B33Y 10/00
See application file for complete search history.

(56) References Cited

U.S. PATENT DOCUMENTS

| 2018/0015660 | A1* | 1/2018 | Mantell | B33Y 10/00 |
| 2018/0297272 | A1* | 10/2018 | Preston | B33Y 50/02 |
| 2021/0046694 | A1* | 2/2021 | Rowe | B33Y 80/00 |
| 2021/0252776 | A1* | 8/2021 | Hoffman | B33Y 30/00 |

* cited by examiner

*Primary Examiner* — Joseph S Del Sole
*Assistant Examiner* — Mohamed K Ahmed Ali

(57) ABSTRACT

The present invention provides a method improving the shear strength of a 3D manufactured product by inserting infill into the interstices between the bead layers.

3 Claims, 5 Drawing Sheets

INTERLOCKING INFILL FOR ADDITIVE MANUFACTURING PRODUCTS

CROSS-REFERENCE TO RELATED APPLICATIONS

This application is a continuation-in-part patent application of U.S. patent application Ser. No. 17/667,081, filed Feb. 8, 2022, which, in turn, is a divisional application of U.S. Pat. No. 11,331,848 issued May 17, 2022 for "3D Printing Bead Configuration" which, in turn, claimed the benefit of U.S. Provisional Patent Application Ser. No. 62/940,419, filed Nov. 26, 2019, for "3D Printing Bead Configuration", the disclosures of which are hereby incorporated by reference, including the drawings.

BACKGROUND OF THE INVENTION

1. Field of the Invention

The present invention pertains to additive manufacturing or 3D printing. More particularly, the present invention concerns the shear strength of an additive manufactured product. Even more particularly, the present invention concerns the bead profiles for use in 3D printing to improve the shear strength of a so-manufactured product.

2. Description of Prior Art

As is known to those skilled in the art to the which the present invention pertains the shear strength of additive manufactured parts and, in particular, 3D printed parts typically suffer from weak shear strength in the X-Y plane. To that end, there is disclosed in the above-identified co-pending application, the shear strength can be improved by alternating the height of the bead in both the top bead layer and lower bead layer.

While the use of the alternating bead heights from layer to layer provides definite improvement in the shear strength, it is still known by those skilled in the art that where the beads or layers are adjacent to the walls of the mold there is still a weakened product. Thus, there would be a major advance in the art by providing a method by which the shear strength of an object proximate the mold wall could be improved. It is to this to which the present invention is directed.

SUMMARY OF THE INVENTION

The present invention provides a method for improving the shear strength of an additive manufactured or 3D printed article of manufacture which, generally, comprises inserting or depositing a strengthening infill into the interstices between overlying adjacent bead layers of infill.

The present invention is applicable to both conventional additive manufactured printed products or objects as well as those additive manufactured printed products or objects using the offset bead configuration disclosed and claimed in the above-referenced co-pending application.

The infill used for both the object wall and the strengthening may be any one of the well-known additive manufacturing materials such as, for example, glass-filled carbonates ABS, ASA, PIA, PETE, polypropylene, TPU, nylon, polycarbonate, PSU, PPSU, PEST, PEI, PEKK, PEEK, carbon and glass fibers, as well as metals, ceramics, sand and cement.

The method hereof for improving the strength of an additive manufactured product, generally, comprises: (a) creating a wall by printing a first bead layer of infill having a first width, (b) printing a second bead layer of infill atop the first layer and having a second width shorter than the first length, (c) repeating steps (a) and (b) sequentially until the wall is created whereby gaps are created between the alternating first and second width layers, and (d) depositing a layer of strengthening infill in the respective gaps and wherein the strengthening infill extends into abutment with the termini or terminal walls of the second width bead layers.

For a more complete understanding reference is made to the following detailed description and the accompanying drawing.

In the drawing like reference characters refer to like parts throughout the several views in which:

DESCRIPTION OF THE INVENTION

Figure 1A:
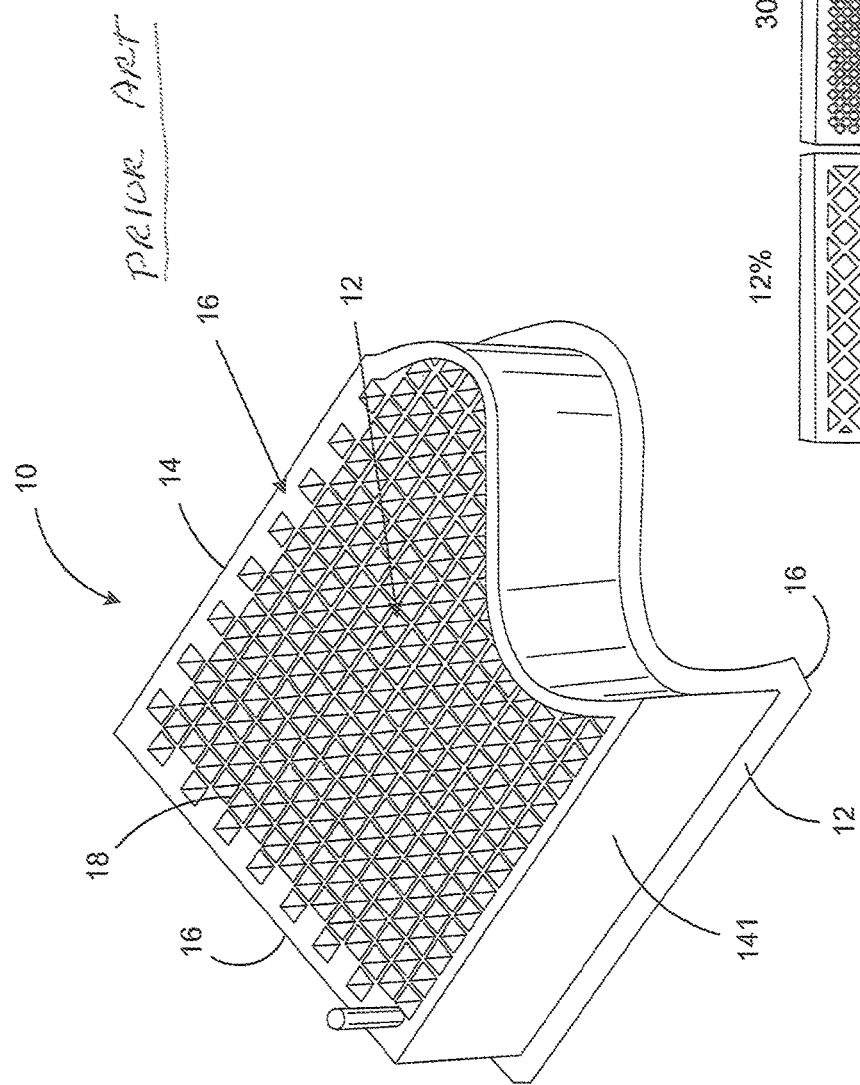
FIGS. 1A and 1B are perspective views illustrating a typical grid configuration according to the prior art.
Figure 2:
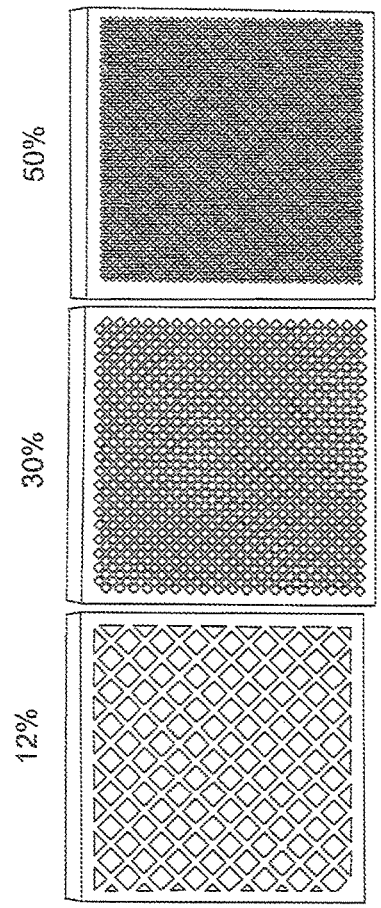
FIG. 2 is a plan view of a grid with various percentages of infill in an additive manufactured product.
Figure 3:
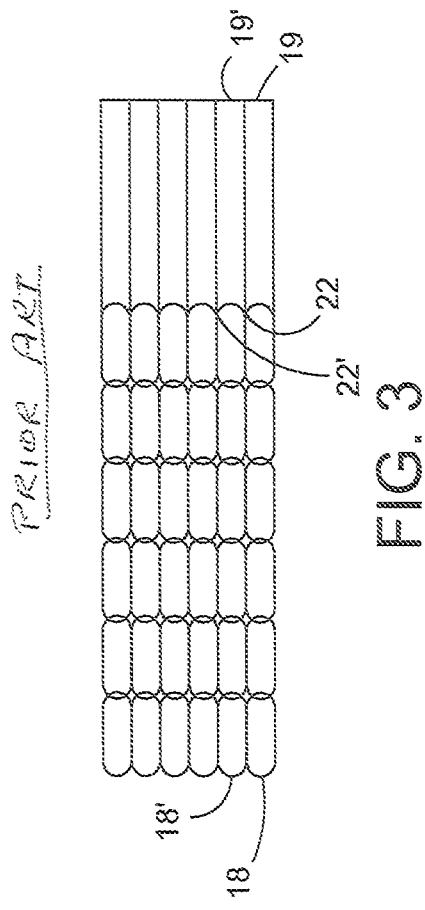
FIG. 3 is a side view of a typical prior art printed object.

By way of background and with reference to FIGS. 1, 1A and 2 there is depicted therein a standard mold configuration utilized during a 3D printing or additive manufacturing process.

Figure 1B:
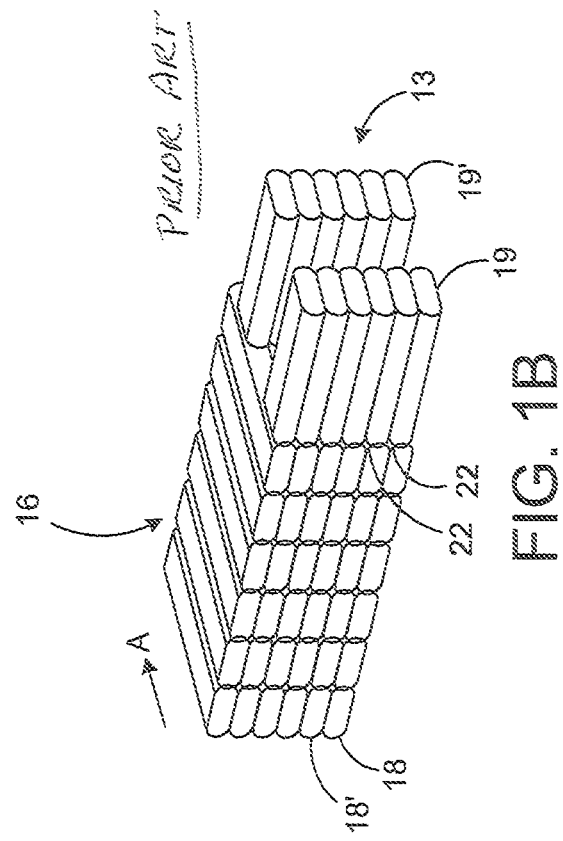

As is known to the skilled artisan a typical additive manufactured product, generally denoted at 10, includes a base or platform 12 and a plurality of upstanding walls 14, 14', etc. which are configured to the shape of the product to be manufactured. Ordinarily, the walls are substantially non-porous and terminate near an upper perimetral top surface 16. The walls typically comprise a plurality of adjacent layers 18, 18', which for illustration purposes, extend in the direction of the arrow A (FIG. 1B).

Typically, infill is deposited in layers of beads 19, 19', etc. in a direction B, and, depending on the nature of the product or object to be produced, can have various porous densities such as those shown in FIG. 2. As noted, the innermost layers which define the wall create abutments for the infill below.

In any event, though, the products being manufactured are created by the layers 18, 18', etc. being deposited atop one another with one or more sequential series of beads being created adjacent thereto as to create a wall of the printed object.

However, as noted above, using present printing processes gaps 22, 22' are created in the spaces or interstices between the infill layers along both the length and width thereof, which diminishes the shear strength of the so-produced product.

Figure 4A:
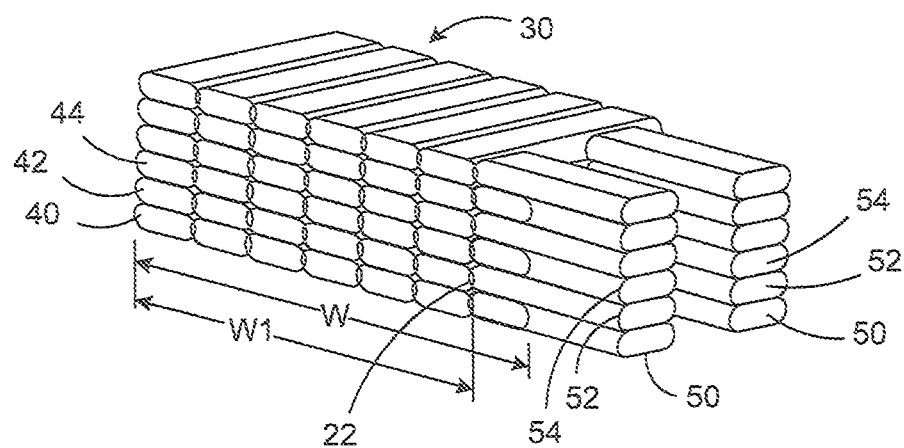
FIG. 4A is a perspective view showing the utilization of the interlocking infill in accordance with the present invention in a standard bead configuration.
Figure 4B:
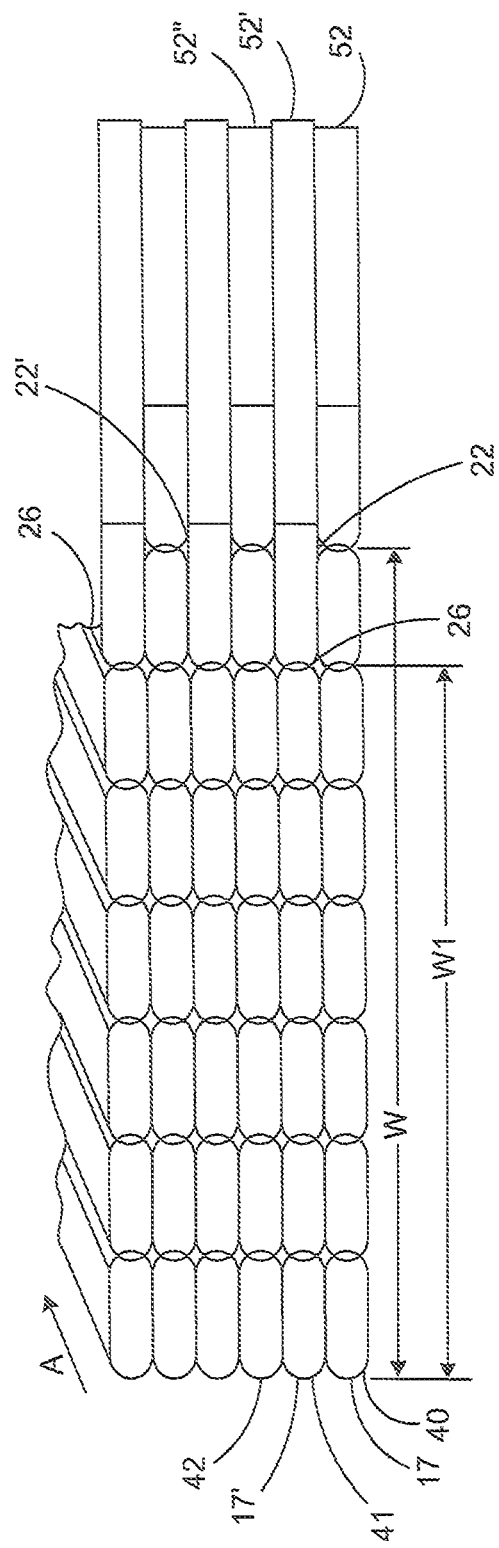
FIG. 4B is a side view showing the utilization of the interlocking infill in accordance with the present invention in a standard bead configuration.

According to the present invention and with reference to FIGS. 4A and 4B and in a first embodiment hereof, a plurality of bead layers 40, 40', etc. are deposited to create a wall 30. The layers 40, 42, 44', etc. have alternating widths W and W1, respectively.

Infill strengthening bead layers 50, 52', etc. each substantially perpendicular or normal or otherwise angularly disposed with respect to an associated layer 40, 42, 44, etc., extend toward the wall(s) and into abutment with the innermost layers and terminal walls along the extent thereof into the gaps between overlying layers 22, 22', etc.

The strengthening infill layer 50, 52, are substantially parallel to each other and abut with an associated portion of the bead layer wall.

The strengthening 50, 52', 54, etc., abuts against a wall portion 26 of the innermost terminal wall of the layers created between the layers of width W.

The strengthening infill 50, 52, 54, etc., can have any desired configuration such as the U-shape shown herein.

The process hereof generally comprises depositing a first bead layer 40 from beads 17 generally along an X-axis and having the width W. A second layer 41 of beads 17' is then deposited thereatop and having the width Ti. Thereafter, a third layer 44 is deposited atop the second layer 42 and has the width W. This process is repeated until the desired height of the wall is achieved. As shown, the innermost beads of the layers each have wall a terminus or wall 26. Due to the difference in widths of the layers, the gaps 22, 22' etc. are created therebetween, as shown.

Abutting strengthening infill layers 50, 52 are then deposited to extend laterally into abutment with the walls of the innermost layers having Width W1 at least intermittently along the extent thereof.

As shown in the drawing the gap which is associated with the alternating terminal walls between the first, third, fifth, etc. layers is filled with the infill strengthening material 50, 52', etc.

By having the interstitial infill hereof disposed within the gaps 22, 22', etc., created by the layering, the shear and tensile strength of the object is further improved.

As shown in FIGS. 4 and 4B, the interstitial infill layers 50, 52 are complementary to the abutting layers and thus are alternating therewith as well as the balance of the bead layers.

Figure 5:
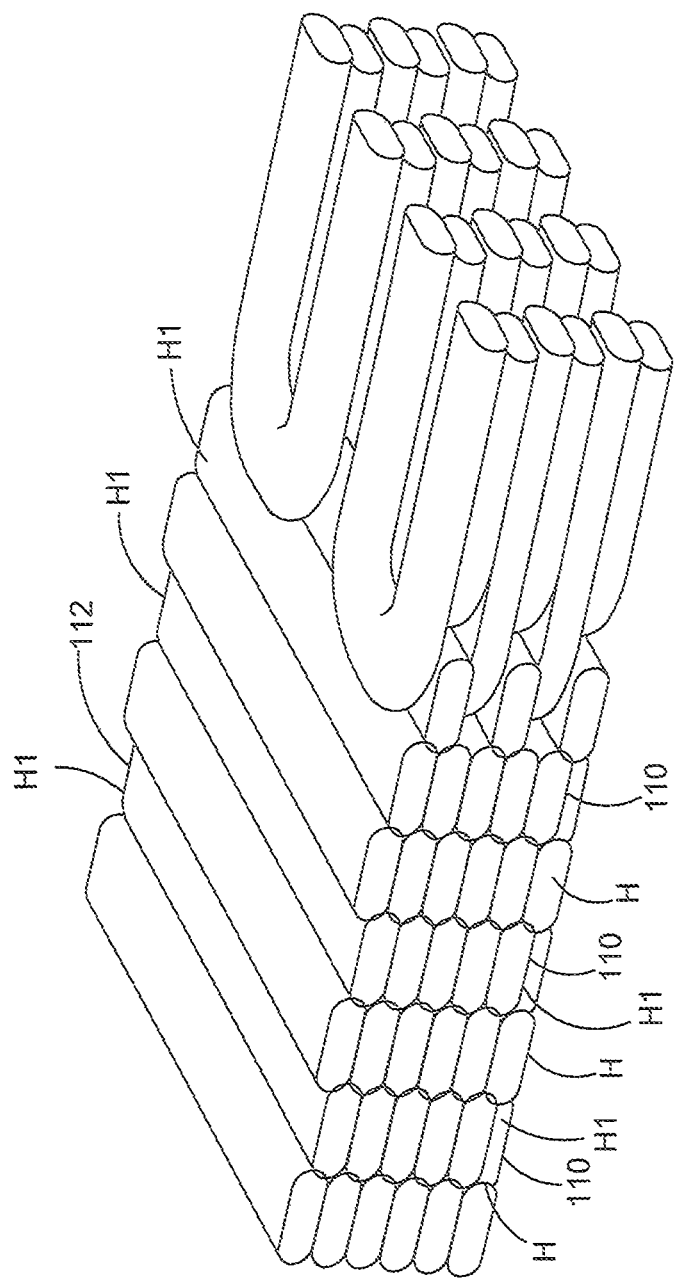
FIG. 5 is a view similar to FIG. 4A but using an offset bead arrangement.

According to a second embodiment hereof and with reference to FIG. 5, the present invention has particular utility with the offset bead figuration disclosed and claimed in the aforesaid co-pending application. According to the disclosure thereof, the beads 110, 112 on the top and bottom layers are deposited in alternating heights of H and H1 such that every other bead in the top and bottom layer is of a first height and the beads therebetween are of a second height which is less than that of the height of the first beads. As a result, there is a lack of parallelism in the various intermediate layers which, thereby, improves the shear strength of the so-manufactured product.

In either embodiment hereof, the interstitial strengthening infill layers are formed from any of the suitable infill materials referenced above including, for example, glass fiber-filled carbonate, PEKK, PEEK and ABS, ASA, PT A, PETE, polypropylene, TPU, nylon, polycarbonate, PSI, PPSU, PESU, PEI, as well as metals, ceramics, sand or cement.

In either embodiment the layers of the interlocking infill layers provide improved strength to the object.

In carrying out the process a conventional extruder such as that sold under the mask Titan may be used herein. This is an extruder which deposits either infill filaments or beads vertically and which moves in the X, Y and Z axes in response to computer controls in the manner well known to the skilled artisans.

Having, thus, described the invention, what is claimed is:

1. A method for increasing a shear strength of a molded additive manufactured product comprising:
   (a) creating a wall from a series of at least three layers of beads of a suitable material, the layers having alternating widths to create an interstitial gap between a first lowermost layer, a second layer above the first lowermost layer and a third layer above the second layer, the first layer and third layer each having a width greater than the width of the second layer to create a gap at the termini of the layers:
   (b) depositing a layer of infill into the gap between the first and third layers;
   (c) repeating steps (a) and (b) sequentially to create gaps between the alternating greater width layers at the termini; and thereafter
   (d) depositing a layer of strengthening infill in the respective repeated gaps: and
   wherein the strengthening infill extends into the gap and into abutment with the wall of the lesser width bead layers, and further wherein each greater width layer has the same number of beads, and each lesser width layer has the same number of beads, each bead in each layer being an oval bead and further wherein the bead height of the beads in the lowermost layer alternate between a first height H1 and a second height H.

2. The method of claim 1, wherein each bead in each layer above the lowermost layer is of equal height.

3. The method of claim 1, wherein:
   each bead in each layer above the lowermost layer is of equal height and width.

\* \* \* \* \*

UNITED STATES PATENT AND TRADEMARK OFFICE
CERTIFICATE OF CORRECTION

PATENT NO. : 12,017,407 B2
APPLICATION NO. : 17/752985
DATED : June 25, 2024
INVENTOR(S) : Mark Saberton Page 1 of 1

It is certified that error appears in the above-identified patent and that said Letters Patent is hereby corrected as shown below:

On the Title Page

Item (63) Related U.S. Application Data should read:
Continuation-in-part of Application No. 17/667,081, filed February 8, 2022, now U.S. Patent No. 11,813,789, issued November 14, 2023, which is a division of Application No. 16/910,556, filed May 27, 2022, now U.S. Patent No. 11,331,848 issued May 17, 2022, which claims the benefit of Provisional Application No. 62/940,419 filed November 26, 2019

Signed and Sealed this
Twenty-fifth Day of February, 2025

Coke Morgan Stewart
*Acting Director of the United States Patent and Trademark Office*